United States Patent
Sajjad et al.

(10) Patent No.: US 11,474,847 B2
(45) Date of Patent: Oct. 18, 2022

(54) PORTABLE VIRTUAL MACHINE IMAGE

(71) Applicant: British Telecommunications Public Limited Company, London (GB)

(72) Inventors: Ali Sajjad, London (GB); Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 173 days.

(21) Appl. No.: 15/733,178

(22) PCT Filed: Dec. 3, 2018

(86) PCT No.: PCT/EP2018/083356
§ 371 (c)(1),
(2) Date: Jun. 4, 2020

(87) PCT Pub. No.: WO2019/110510
PCT Pub. Date: Jun. 13, 2019

(65) Prior Publication Data
US 2020/0387392 A1 Dec. 10, 2020

(30) Foreign Application Priority Data
Dec. 4, 2017 (EP) ..................................... 17205248

(51) Int. Cl.
*G06F 9/455* (2018.01)
*G06F 16/11* (2019.01)
*G06F 9/50* (2006.01)

(52) U.S. Cl.
CPC ........ *G06F 9/45558* (2013.01); *G06F 9/5077* (2013.01); *G06F 16/116* (2019.01); *G06F 2009/4557* (2013.01)

(58) Field of Classification Search
CPC .................................................. G06F 9/45558
(Continued)

(56) References Cited

U.S. PATENT DOCUMENTS 9,672,060 B2 * 6/2017 Behere ................ G06F 9/45558
10,346,188 B1 * 7/2019 Christensen ............ G06F 9/445
(Continued)

FOREIGN PATENT DOCUMENTS

WO WO-2019110510 A1 6/2019

OTHER PUBLICATIONS

Extended European Search Report for Application No. 17205248.2, dated Jun. 13, 2018, 10 pages.
(Continued)

*Primary Examiner* — Mehran Kamran
(74) *Attorney, Agent, or Firm* — Patterson Thuente IP

(57) ABSTRACT

A computer implemented method of converting a serialized virtual machine (VM) for a source virtualized computing environment, the serialized VM being stored in a data file having also metadata for instantiating the serialized VM in the source environment, the method including supplementing the data file with a software adapter including a plurality of executable disk image converters, each disk image converter being suitable for converting the serialized VM between disparate virtualized computing environments; a plurality of metadata mappings, each metadata mapping defining how the metadata is converted between disparate virtual computing environments; and executable code for effecting a conversion by executing an appropriate disk image converter and performing an appropriate metadata conversion to convert the data file for a target virtualized computing environment, such that the supplemented data file is operable to self-convert between the source virtualized computing environment and the target virtualized computing environment by execution of the executable code.

4 Claims, 1 Drawing Sheet

(58) Field of Classification Search
USPC .......................................................... 718/1
See application file for complete search history.

(56) References Cited

U.S. PATENT DOCUMENTS

| | | | | |
|---|---|---|---|---|
| 2008/0263258 | A1* | 10/2008 | Allwell | G06F 9/461 |
| | | | | 711/6 |
| 2010/0088699 | A1* | 4/2010 | Sasaki | G06F 8/63 |
| | | | | 718/1 |
| 2010/0223610 | A1* | 9/2010 | Dehaan | G06F 8/63 |
| | | | | 717/178 |
| 2011/0307531 | A1* | 12/2011 | Gaponenko | G06F 8/63 |
| | | | | 707/822 |
| 2012/0151476 | A1* | 6/2012 | Vincent | G06F 9/4856 |
| | | | | 718/1 |
| 2012/0311106 | A1* | 12/2012 | Morgan | G06F 9/45558 |
| | | | | 709/220 |
| 2013/0139154 | A1* | 5/2013 | Shah | G06F 9/45558 |
| | | | | 718/1 |
| 2013/0139155 | A1* | 5/2013 | Shah | G06F 9/45558 |
| | | | | 718/1 |
| 2015/0169343 | A1* | 6/2015 | Lissack | G06F 9/45533 |
| | | | | 718/1 |
| 2015/0324216 | A1* | 11/2015 | Sizemore | G06F 9/45545 |
| | | | | 718/1 |
| 2015/0370593 | A1* | 12/2015 | Kuroda | G06F 9/44505 |
| | | | | 718/1 |
| 2017/0024260 | A1* | 1/2017 | Chandrasekaran | G06F 8/63 |
| 2017/0262307 | A1* | 9/2017 | Venkatesh | G06F 9/45533 |
| 2018/0081655 | A1* | 3/2018 | Kudriavtsev | G06F 8/51 |
| 2018/0189089 | A1* | 7/2018 | Chen | G06F 9/45558 |
| 2018/0203719 | A1* | 7/2018 | Zhang | G06F 3/0647 |
| 2019/0250960 | A1* | 8/2019 | Zhang | G06F 8/63 |
| 2021/0216360 | A1* | 7/2021 | Lin | G06F 9/45558 |

OTHER PUBLICATIONS

Office Action For GB Application No. 1720173.2, dated Jun. 1, 2018, 8 pages.

Vmware Vapp Developer Blog, "Inside the OVF Package," Aug. 10, 2009, 3 pages.

* cited by examiner

PORTABLE VIRTUAL MACHINE IMAGE

PRIORITY CLAIM

The present application is a National Phase entry of PCT Application No. PCT/EP2018/083356, filed Dec. 3, 2018, which claims priority from EP Patent Application No. 17205248.2, filed Dec. 4, 2017, each of which is hereby fully incorporated herein by reference.

TECHNICAL FIELD

The present disclosure relates to a portable virtual machine image for a virtualized computer system.

BACKGROUND

Virtual machine (VM) migration is an important and inevitable part of the operations of modern-day data centers and cloud computing deployments. VM conversion tools are available in both open source and commercial domains that enable system administrators to transport workloads from any physical or virtual source to any physical or virtual destination. They also aid in server consolidation efforts such as physical-to-virtual (P2V).

Existing VM conversion tools are platform-specific in that they support conversion of a serialized VM from potentially multiple source virtualized computing environments (formats) a format of a single target computing environment. Often, these tools are provided by the virtualization vendors themselves at no cost to facilitate migration to the vendor's format. However, the possibility to reverse the conversion process is usually either not possible, time-consuming, cumbersome, or prone to introduce errors.

Thus, it is desirable to provide for virtual machine images that alleviate the aforementioned challenges.

SUMMARY

The present disclosure accordingly provides, in a first aspect, a computer implemented method of converting a serialized virtual machine (VM) for a source virtualized computing environment, the serialized VM being stored in a data file having also metadata for instantiating the serialized VM in the source environment, the method comprising: supplementing the data file with a software adapter comprising: a plurality of executable disk image converters, each disk image converter being suitable for converting the serialized VM between disparate virtualized computing environments; a plurality of metadata mappings, each metadata mapping defining how the metadata is converted between disparate virtual computing environments; and executable code for effecting a conversion by executing an appropriate disk image converter and performing an appropriate metadata conversion to convert the data file for a target virtualized computing environment, such that the supplemented data file is operable to self-convert between the source virtualized computing environment and the target virtualized computing environment by execution of the executable code.

In some embodiments, the executable code is further arranged to perform the supplementing step on the data file as converted so as to include the disk image converters, the metadata mappings and the executable code in the converted data file.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Figure 1:
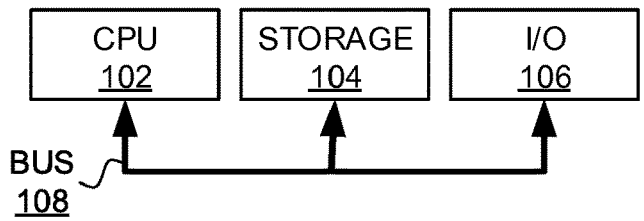
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Virtual machines (VMs) are virtual representations of physical machines instantiated for execution as software in a virtual computing environment using, for example, a hypervisor or similar. The operation of a VM is therefore entirely software and can be represented in a digital form at any point in time in its execution. Accordingly, it is not uncommon for VMs to be serialized as streams of binary data for archiving, migration to a similar virtualized computing environment or even for migration to a different virtualized computing environment. Such serialized forms of VMs are typically stored in a data file including metadata for indicating characteristics of the VM or the virtualized computing environments in which the VM was executing. For example, environment or VM versioning, content identification, serialized type such as a type of emulated disk storage used to represent the serialized VM, access permission attributes, data offset information, time stamps and the like. Notably, the migration of a serialized VM to a different virtualized computing environment can be challenging because virtualized computing environments of different vendors are notoriously not compatible. Indeed, even environments of different versions from the same vendor can be incompatible. Thus, a serialized form of a VM from one environment will often not be readable for instantiation and execution in a different environment.

Figure 2:
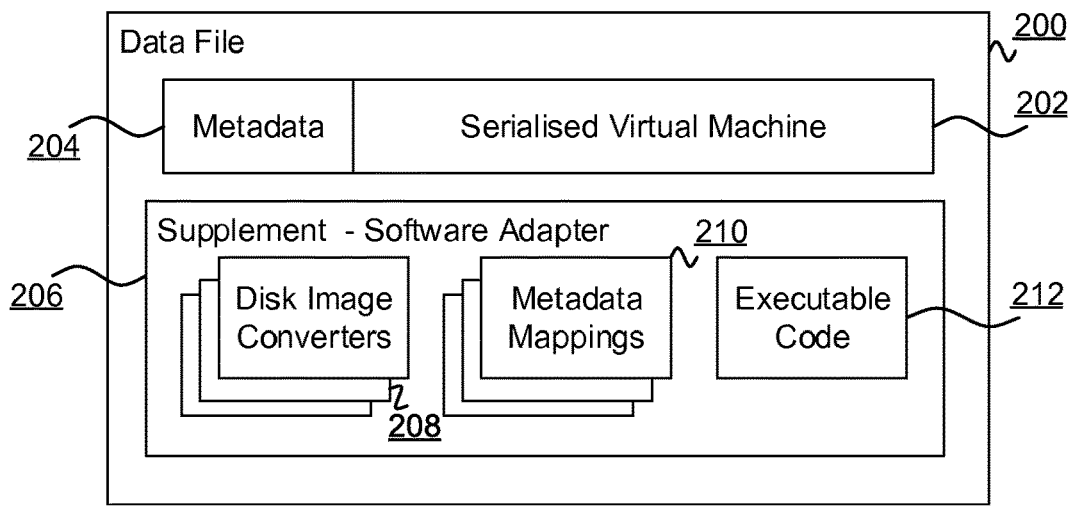
FIG. 2 illustrates a data file in accordance with embodiments of the present disclosure.

Embodiments of the present disclosure provide a data file for storing a serialized VM including metadata that is capable of self-conversion for a target virtualized computing environment. FIG. 2 illustrates a data file 200 in accordance with embodiments of the present disclosure. The data file 200 includes metadata 204 and binary data constituting a serialized VM 202. The metadata 204 and form or format of the serialized VM are organized, structured and/or formatted according to requirements for a particular virtualized computing environment—referred to here as a source virtualized computing environment (i.e. an environment from which the serialized VM originates).

Embodiments of the present disclosure provide for the addition of a supplement 206 to the data file 200 as a software adapter such that additional information and executable code is provided in the data file. The software adapter 206 can be self-contained and located in any suitable location within the data file such as at a beginning or end of the data file. In one embodiment, the supplement 206 can be stored so as to appear to be a part of the serialized VM, such as a binary appendage to the serialized VM, with any size or length indication for the serialized VM being updated to reflect the addition of the software adapter 206.

The supplement 206 includes three main components: a set of disk image converters 206; a set of metadata mappings 210; and executable code 212. The disk image converters 206 are executable components each suitable for converting the serialized VM 202 to a different format such as a format for a particular target virtualized computing environment. For example, formats of the serialized VM can include, inter alia: VMDK (virtual machine disk) format as is typically employed by VMWare products; VHD (virtual hard disk) format as is typically employed by Microsoft products; VDI (VirtualBox Disk Image) format as is typically employed by VirtualBox products; and qcow2 (QEMU copy on write) format as is typically employed by QEMU products. Thus, a suite of disk image converters 208 is provided with the data file.

Further, the supplement includes a set of metadata mappings 210 each being suitable for mapping the contents of the metadata 204 to a different metadata format for a target virtual computing environment. Notably, the metadata mappings 210 can be markup language mappings such as XML mappings. In some cases there will not be a mapping for a particular metadata data item and a mapping 204 will indicate how such data is to be handled, such as how data that is redundant in a target metadata format is to be stored in a comment field for later retrieval should the format be subsequently changed, and/or how data not existing in a source format but required in a target format can be sourced such as by being generated, calculated, measured or obtained or retrieved from a previously stored location such as a comment field of a source metadata format.

The executable code 212 is an executable software routine for effecting a conversion of the serialized VM 202 along with the associated metadata 204 from a format suitable for the source virtualized computing environment to a source suitable for a target virtualized computing environment. The executable code 212 included in the data file 200 achieves this conversion by executing appropriate disk image converters 208 and employing appropriate metadata mappings 210. A further important function of the executable code 212 is to ensure the supplement 206 is further propagated by inclusion in an output data file or converted data file 200 generated or arising as a product of the conversion process. In this way, the supplement provides the possibility for the data file 200 containing the serialized VM 202 to effect self-conversion from a source virtualized computing environment to a target virtualized computing environment, while retaining the opportunity for further conversions later by the inclusion of the supplement 206.

Figure 3:
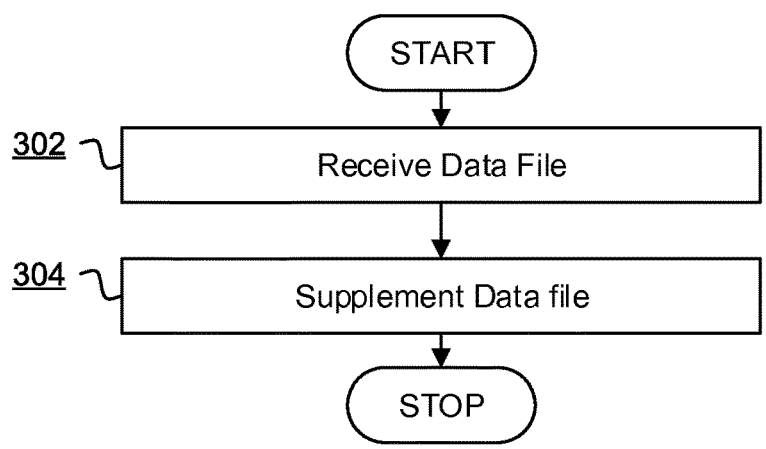
FIG. 3 is a flowchart of a method of the present disclosure.

FIG. 3 is a flowchart of a method of the present disclosure. Initially, at 302, the method receives a data file 200 including a serialized VM 202 and associated metadata 204. Subsequently, at 304 the method supplements the data file 200 with a software adapter 206. The software adapter comprises: a plurality of executable disk image converters 208 as hereinbefore described; a plurality of metadata mappings 210 as hereinbefore described; and executable code 212 as hereinbefore described. Thus, the executable code effects a conversion by executing an appropriate disk image converter and performing an appropriate metadata conversion to convert the data file for a target virtualized computing environment.

In some embodiments, the executable code is further arranged to perform the supplementing step on the data file as converted so as to include the disk image converters, the metadata mappings and the executable code in the converted data file.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of converting a serialized virtual machine (VM) for a source virtualized computing environment, the serialized VM being stored in a single data file having metadata for instantiating the serialized VM in the source virtualized computing environment, the method comprising:

the data file including a software adapter comprising:
a plurality of executable disk image converters, each executable disk image converter being suitable for converting the serialized VM between disparate virtualized computing environments;

a plurality of metadata mappings, each of the plurality of metadata mappings defining how the metadata is converted between disparate virtual computing environments; and executable code for effecting a conversion by executing an appropriate disk image converter and performing an appropriate metadata conversion to convert the data file for a target virtualized computing environment, such that the data file is operable to self-convert between the source virtualized computing environment and the target virtualized computing environment by execution of the executable code.

2. The method of claim 1, wherein the executable code is further arranged to perform on the data file as converted so as to include the disk image converters, the metadata mappings and the executable code in the converted data file.

3. A computer system comprising:

a processor and memory storing computer program code for converting a serialized virtual machine (VM) for a source virtualized computing environment, the serialized VM being stored in a single data file having metadata for instantiating the serialized VM in the source virtualized computing environment, by:

the data file including a software adapter comprising:

a plurality of executable disk image converters, each executable disk image converter being suitable for converting the serialized VM between disparate virtualized computing environments;

a plurality of metadata mappings, each of the plurality of metadata mappings defining how the metadata is converted between disparate virtual computing environments; and executable code for effecting a conversion by executing an appropriate disk image converter and performing an appropriate metadata conversion to convert the data file for a target virtualized computing environment, such that the data file is operable to self-convert between the source virtualized computing environment and the target virtualized computing environment by execution of the executable code.

4. A non-transitory computer-readable storage element comprising computer program code to, when loaded into a computer system and executed thereon, cause the computer system to perform the method as claimed in claim 1.

* * * * *

UNITED STATES PATENT AND TRADEMARK OFFICE
CERTIFICATE OF CORRECTION

PATENT NO.          : 11,474,847 B2
APPLICATION NO.     : 15/733178
DATED               : October 18, 2022
INVENTOR(S)         : Ali Sajjad It is certified that error appears in the above-identified patent and that said Letters Patent is hereby corrected as shown below:

In the Drawings

FIG. 2, in Tag "202", Line 1, delete "Serialised" and insert -- Serialized --, therefor.

In the Specification

In Column 2, Line 16, delete "diagram a" and insert -- diagram of a --, therefor.

In Column 3, Line 19, delete "disk image converters 206;" and insert -- disk image converters 208; --, therefor.

In Column 3, Lines 20-21, delete "disk image converters 206" and insert -- disk image converters 208 --, therefor.

In Column 3, Line 39, delete "mapping 204" and insert -- mapping 210 --, therefor.

In Column 4, Line 24, delete "invention." and insert -- disclosure. --, therefor.

In Column 4, Line 43, delete "invention" and insert -- disclosure --, therefor.

In Column 4, Line 45, delete "invention." and insert -- disclosure. --, therefor.

In Column 4, Line 45, delete "invention" and insert -- disclosure --, therefor.

Signed and Sealed this
Twenty-fifth Day of April, 2023

Katherine Kelly Vidal
*Director of the United States Patent and Trademark Office*